UNITED STATES PATENT OFFICE.

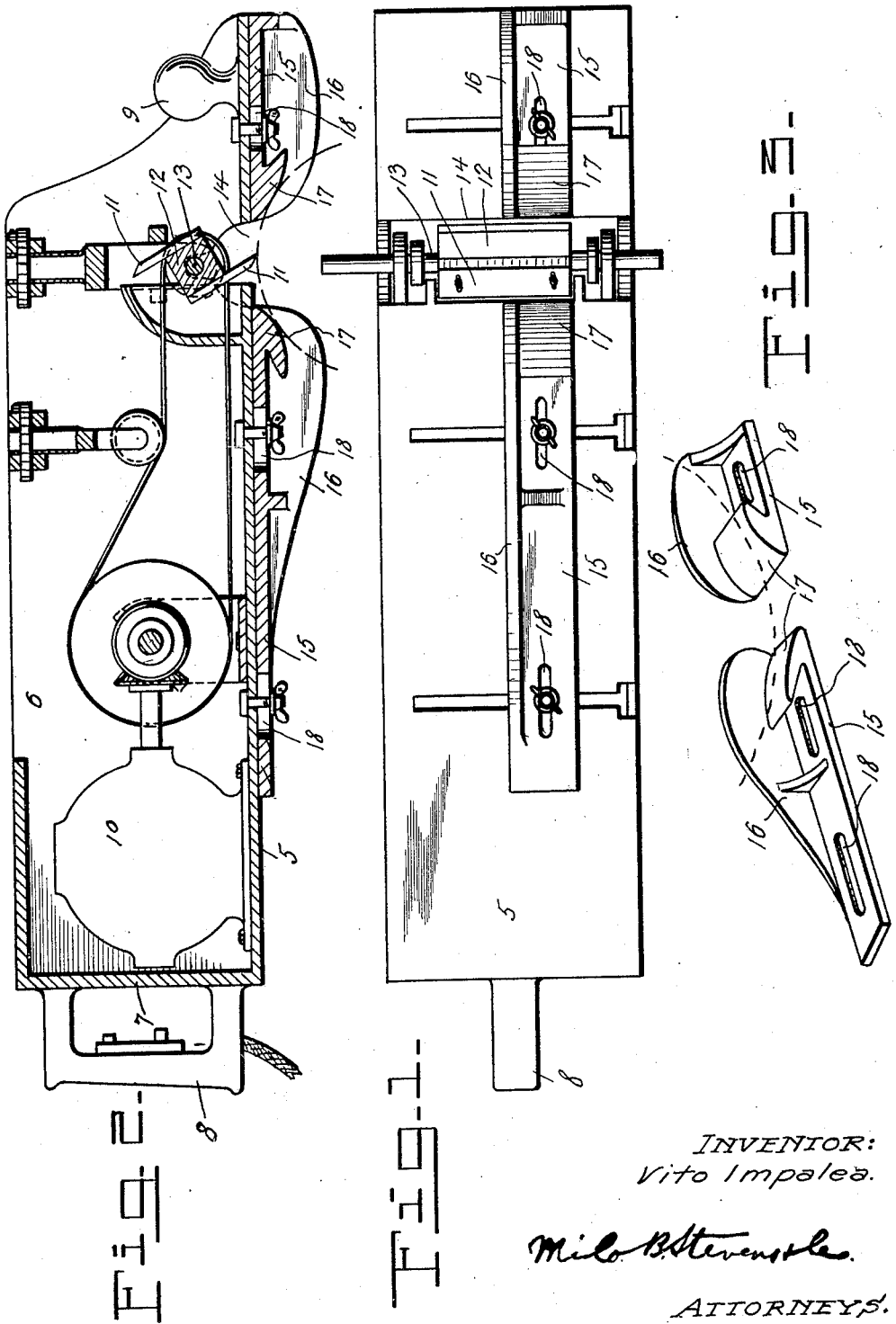

VITO IMPALEA, OF CHICAGO, ILLINOIS.

GAGE ATTACHMENT FOR PLANES.

1,357,985.  Specification of Letters Patent.  Patented Nov. 9, 1920.

Application filed June 16, 1919. Serial No. 304,628.

*To all whom it may concern:*

Be it known that I, VITO IMPALEA, a subject of the King of Italy, residing at Chicago, in the county of Cook and State of Illinois, have invented new and useful Improvements in Gage Attachments for Planes, of which the following is a specification.

This invention relates to hand-propelled wood working tools similar to a carpenter's plane, but equipped with a power driven rotary cutter, and the object of the invention is to provide the tool with a novel and improved guide attachment as will be described hereinafter in detail.

In order that the invention may be better understood, reference is had to the accompanying drawing forming a part of this specification, and in said drawing, Figure 1 is a plan view of the tool showing the guide attachment applied thereto;

Fig. 2 is a longitudinal section, and

Fig. 3 is a perspective view of the guide attachment detached.

Referring specifically to the drawing the frame or body of the tool resembles that of a carpenter's plane, the same having a base 5, side walls 6 and a rear end wall 7 provided with a hand grip 8. At the opposite end, the base has the usual knob 9. Adjacent to the rear end of the plane is an electric motor 10, the same being mounted on the base 5, and having a driving connection with a rotary cutter comprising knives 11 carried by a cutter head 12 mounted on a shaft 13 extending transversely of the base 5. Beneath the cutter, the base 5 has a transverse opening 14 through which the knives 11 protrude to engage with the work.

A guide attachment is provided for work having a rounded contour. This attachment is composed of two separate sections, each comprising a base plate 15 having an upstanding flange 16 at one longitudinal edge, and inclined work rests 17 at one end. The two sections are bolted to the under side of the base 5 to locate the rests 17 on opposite sides of the rotary cutter, with the inclined surface of the rests 17 facing each other so that they may engage the work tangentially. The dotted curved line in Figs. 1 and 3 indicate the work resting on the inclined surfaces. The two guide members can be spread more or less according to the size of the work, and for the purpose of this adjustment, the base plates 15 have slots 18 through which pass the fasteners whereby the two devices are secured to the base 5. For trimming the edge of a table top, the implement may be turned over on its side so that the flanges 16 may serve as guides and support the implement while it is being carried around the edge of the work. The edge of the table top can therefore be trimmed without placing it in a vertical position.

I claim:

1. A plane comprising a base having an opening, a rotary cutter mounted above the base over the opening to protrude therethrough, and guide plates mounted on the bottom of the base, said plates having opposite and spaced guide surfaces engageable by the work, and said guide surfaces being on opposite sides of and inclined toward the aforesaid opening in the base.

2. A plane comprising a base having an opening, a rotary cutter mounted above the base over the opening to protrude therethrough, guide plates mounted on the bottom of the base, said plates having opposite and spaced guide surfaces engageable by the work, and said guide surfaces being on opposite sides of and inclined toward the aforesaid opening in the base, and means for adjusting the plates to vary the spacing of the guide surfaces.

3. A plane comprising a base having an opening, a rotary cutter mounted above the base over the opening to protrude therethrough, and guide plates mounted on the bottom of the base, said plates having opposite and spaced guide surfaces engageable by the work, and said guide surfaces being on opposite sides of and inclined toward the aforesaid opening in the base, said plates also having outstanding longitudinal guide flanges.

In testimony whereof I affix my signature.

VITO IMPALEA.